United States Patent [19]

Rose

[11] Patent Number: 4,613,110
[45] Date of Patent: Sep. 23, 1986

[54] APPARATUS FOR VENTING OF DIES IN MOLDING OF THERMOSET PLASTIC COMPOUNDS

[76] Inventor: Robert H. Rose, 13850 Forest Grove Rd., Brookfield, Wis. 53005

[21] Appl. No.: 537,168

[22] Filed: Oct. 3, 1983

Related U.S. Application Data

[63] Continuation-in-part of Ser. No. 501,645, Jun. 6, 1983, Pat. No. 4,562,990.

[51] Int. Cl.$^4$ ............................................ B29C 33/10
[52] U.S. Cl. .................................. 249/141; 425/543; 425/812
[58] Field of Search ............... 425/420, 444, 543, 546, 425/544, 554, 556, 577, 812; 264/334, 339, 102; 249/67, 141

[56] References Cited

U.S. PATENT DOCUMENTS

| 2,976,571 | 3/1961 | Moslo | 249/141 |
| 3,349,833 | 10/1967 | Hodler | 425/812 |
| 3,483,288 | 12/1969 | Paulson | 249/141 |
| 3,889,919 | 6/1975 | Ladney, Jr. | 249/141 |
| 3,903,956 | 9/1975 | Pekrol | 249/67 |
| 4,008,031 | 2/1977 | Weber | 425/450.1 |
| 4,431,047 | 2/1984 | Takeshima et al. | 425/812 |

Primary Examiner—Jay H. Woo
Assistant Examiner—J. Fortenberry
Attorney, Agent, or Firm—Robert T. Johnson

[57] ABSTRACT

This invention discloses improved venting of dies in molding of thermoset plastic molding compounds wherein said invention consists of a vent system comprising a vent extending from a molding die to a vent well and said vent well venting to the atmosphere. This can be depicted as: die to vent well to atmosphere.

3 Claims, 4 Drawing Figures

APPARATUS FOR VENTING OF DIES IN MOLDING OF THERMOSET PLASTIC COMPOUNDS

This is a continuation in part of U.S. application Ser. No. 501645 filed June 6, 1983 now U.S. Pat No. 4,562,990 issued Jan 7, 1986.

In transfer or injection and similar molding of thermoset plastic compounds, the dies are usually vented opposite the gate through which plasticized compound is fed into the die. There are instances, however, where the vent is not opposite the gate due to geometry of the part or location of the gate. Often the vent location is determined by filling or injecting material into the die and on locating the gas mark, knit line, or pocket, the vent is then made in the die at or near this location, regardless of gating.

It has been determined that this invention solves the problems of inadequate die venting, yet allows full densification of material forced into the die.

When dies for molding of thermoset plastic molding compounds are not adequately vented, the resultant moldings are marked by inadequate fill of the die, and may have so-called burned spots, and indications of short fill due to gas entrapment.

One of the objects of this invention is to disclose a die vent system comprising die vent to vent well to vent to atmosphere, to obviate the above stated problems of inadequate venting.

Another object of this invention is to diclose a die venting apparatus of this invention in molding of thermoset plastic compounds wherein the improvement comprises die venting apparatus of a die vent to vent well to vent to atmosphere consisting of said die vent attached from said die to said vent well which in turn is attached to said vent to atmosphere.

This vent, vent system or die venting means is to be considered a vent comprised of a vent from a die to a vent well and the vent well in turn to vent to the atmosphere. For this invention terminology, "vent" refers to collective or assembled components mentioned above, unless modified by a specific identification, to identify a specific component or part.

Another object of this invention is to disclose die venting means to insure adequate fill of the die.

Another object of this invention is to disclose die venting means ising a vent well outside of the molding die. o Another object of this invention is to disclose die venting means comprising a vent well outside of the die and connected thereto by a vent path to fill said vent well with compound, and means comprising a knock out pin to eject the material from said vent, and vent well.

Another object of this invention is to disclose venting of dies in molding of thermoset plastic compounds, comprising in elevation a vent well having, a right triangle shape having angles of 30°, 60° and 90°, a knock out pin in contact with said vent well, and vent extension from said vent well to atmosphere.

Another object of this invention is to disclose venting of a die in molding of thermoset molding compounds, comprising a vent well outside of the die, said vent well connected to said die by means of a vent, and said vent having a taper of 4°.

Another object of this invention is to disclose venting of a die in molding of thermoset molding compounds consisting of a vent system comprising a vent well connected to said die by a vent, and said vent well connected to a vent to atmosphere.

Another object of this invention is to disclose venting of a die in molding of thermoset plastic molding compounds, comprising a die, die vent and a vent well connected thereto by means of said die vent and vent extension from said vent well to atmosphere and means to eject cured compound from said vent well.

This invention may be referred to as a vent system.

INFORMATION DISCLOSURE OF RELEVANT ART

Background art considered pertaining to this present invention is as follows.

U.S. Pat. No. 2,178,774—Method of Making a Golf Ball—This patent discloses straight vents opposite the fill gate of the molding, which vents are merely straight holes to vent the air out of the die during fill of the die with the thermoplastic material, then plugs are inserted into the vents to develop more pressure in the die. This would not be usable in molding of thermoset compound.

U.S. Pat. No. 3,377,662—Metal Mold Having Vent Plug Means For Shaping a Plastic Article And Vulcanizing a Rubber Article. This patent discloses a vent means comprising a cylinder and a removal plug with grooves thereon. This patent then does not touch this present application.

U.S. Pat. No. 3,822,857—Synthetic Resin Plug for Vent Hole of Mold. This patent covers plugs with micro holes for die venting. This present Rose invention does not involve such as is disclosed in this patent.

U.S. Pat. No. 4,126,291—Injection Mold For Elongated Hollow Articles. This patent pertains to molding of elongated hollow articles and vents in a manner comprising spiral flats ground on vent pin.

U.S. Pat. No. 4,140,470—Transfer Molding Venting System. "Venting" patent concerns a filter means to allow flow of gases but not elastomeric materials being molded. This does not concern the present Rose invention.

U.S. Pat. No. 4,359,443—Venting Arrangement For Matched Molds and Method. The venting of this patent involves a gasket between the mold halves with vents being tubes through the gasket. This present Rose invention does not involve such a gasket or tubes to serve as vents.

17—Vent from molding to vent 4.
18—Intercept of line formed between angle 11 and angle 10 extended to top surface of vent 4.
19—Molding compound in knock out pin hole.
21—Interface of molding compound and knock out pin.

Figure 2:
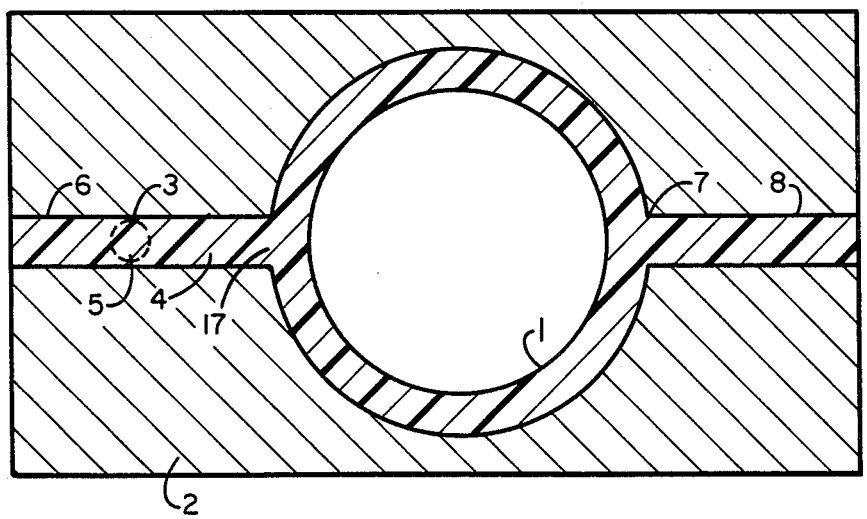

FIG. 2 is plan view wherein:
1—Molding.
2—Die cavity block; female section.
3—Vent well.
4—Vent path from die to vent well.
5—Knock out pin location.
6—Vent opening from vent well to atmosphere.
7—Gate.
8—Runner.

Figure 3:
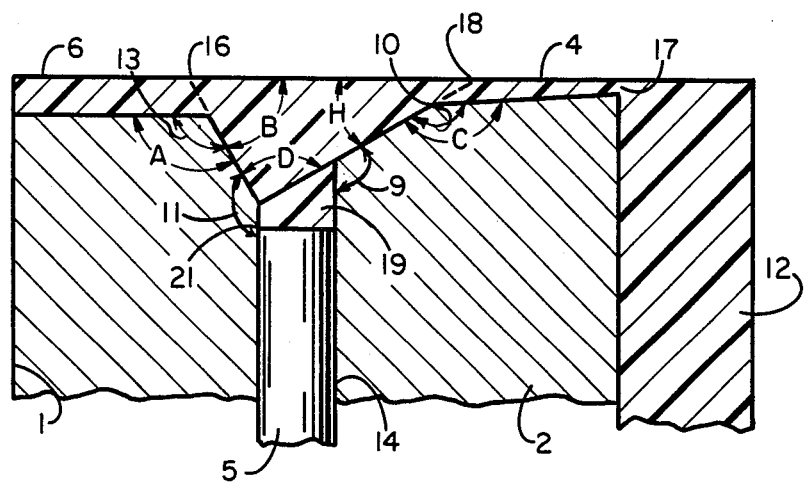

FIG. 3—Enlarged elevation view of die vent wherein:
2—Die cavity block; female section.
3—Vent well.
4—Vent path from die to vent well.
5—knock out pin.
6—Vent opening from vent well to atmosphere.
9—Transition angle from vent well to knock out hole.
10—Transition angle from die vent to vent well.
11—Transition angle from vent well to knock out hole.
12—Molding section in die.
13—Transition angle from vent well to vent 6 to atmosphere.
14—Knock out pin hole.
16—Intercept of line formed between angle 11 and angle 13 extended to top of vent 4.
17—Vent at molding to vent well.
18—Intercept of line formed between angle 11 and angle 10 extended to top of vent 6.
19—Molding compound in knock out pin hole.
21—Interface of molding compound and knock out pin.

Figure 4:
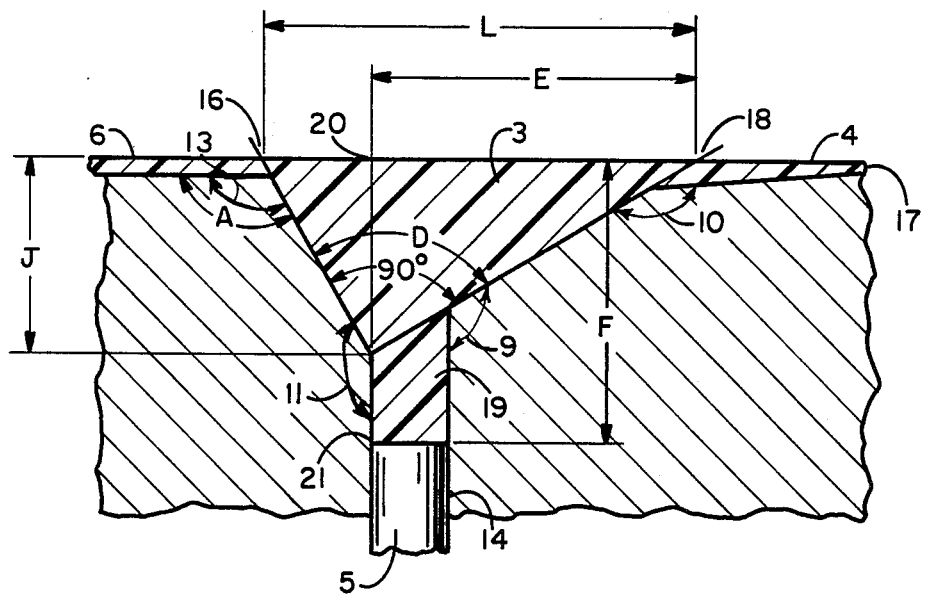

FIG. 4 shows the lay out in side elevation of the vent path 4, vent well 3, and vent opening 6 to atmosphere wherein:
L is length of hypotenuse which is line 18-16.
E is length on hypotenuse from 18 to 20.
F is length from hypotenuse at top vent surface 20 to 21.
J is length of line 11-20 which line is perpendicular to hypotenuse.

DESCRIPTION OF INVENTION

This present invention is to disclose means to vent dies in molding of thermoset plastic compounds, which comprises a total vent configuration or vent system for adequate venting of a die without sacrificing quality of moldings due to loss of back pressure in molding.

Figure 1:
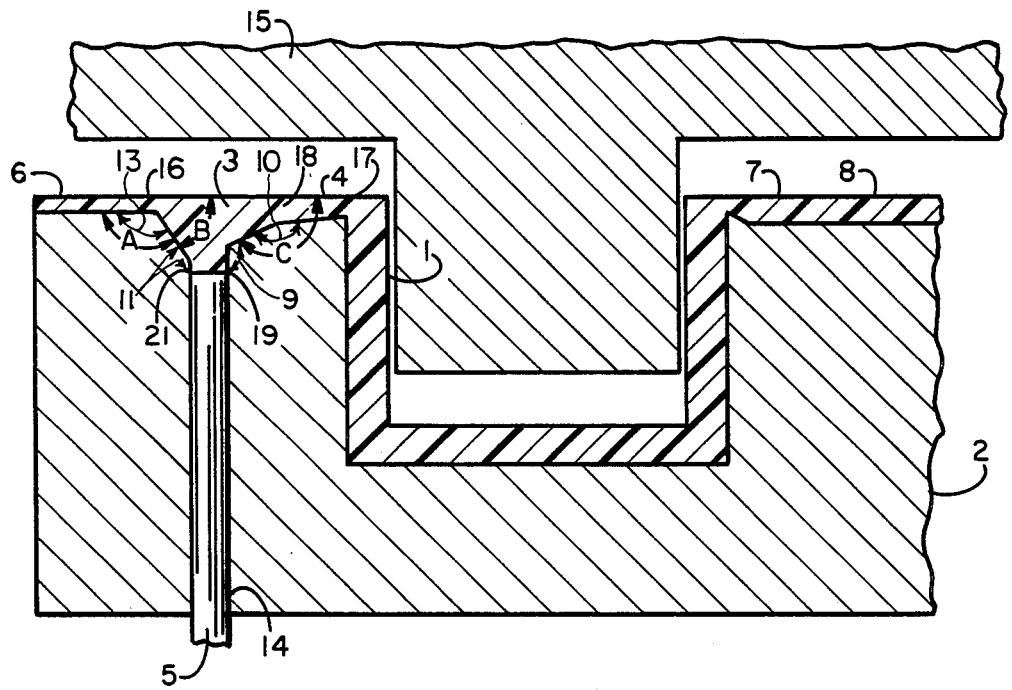
FIG. 1 is elevation view wherein:
1—Molding.
2—Die cavity block; female section.
3—Vent well.
4—vent path from die to vent well.
5—Knock out pin.
6—Vent opening from vent well to atmosphere.
7—Gate.
8—Runner.
9—Transition angle from well to knock out hole.
10—Transition angle from die vent to vent well.
11—Transition angle from well to knock out hole.
13—Transition angle from vent well to vent to atmosphere.
14—Knock out pin hole.
15—Male die section.
16—Intercept of line formed between angle 11 and angle 13 extended to top surface of vent 4.

FIG. 1 is elevation view of this invention wherein the molding 1, is shown in die cavity block, female section 2, vent 17 from die, through vent path 4 to vent well 3 to vent 6 to atmosphere. Vent well 3 is vented into vent opening 6 from vent well and said vent opening 6 exhausts to atmosphere. The thermoset compound for example is fed into the die from runner 8 through gate 7. The vent well 3 is comprised of a right triangle shape in side elevation view wherein the angles of said triangle are 90°, 30° and 60°. Transition angle from vent well to knock out pin hole 9, is such that the knock out pin 5 is parallel to ejection of the molding from the die.

The vent well 3 in elevation, as shown in expanded view FIG. 3, is best described as a right triangle with line 11-18 joining extension of line 11-16 at D=90°, thus the angle D at the bottom of vent well 3 is 90°. On extending line 11-13 to 16 at the intersection of top surface of vent path 4, the angle 11, 16, 18 is B=60°, or stated another way, angle A is 120°.

Angle C is 154° since the taper of vent path 4 is 4° from die vent 17 to transition angle 10 at the vent well. Angle H is 30° for angle 11, 18, 16 of vent well 3.

Extending outwards from vent well 3, to atmosphere is vent 6, beginning at transition angle 13 from vent well to atmosphere.

Vent path 4 is tapered outwardly as shown in elevation FIG. 3, with said taper to be 4° from die vent 17 to transition angle.

Vent opening 6 is open to atmosphere and said opening to atmosphere could be 0.0508 mm for example, in elevation.

Vent path 4 is tapered as shown in elevation FIG. 3 with said taper to be at 4° and said taper to be toward the vent well 3, and to be from die vent 17 to transition angle from die vent to vent well 10. The above mentioned taper is only on the elevation, not on the width of the vent.

The above described angles represent the best mode of die venting of this invention, however the angles of the vent well may vary and still do an adequate job of venting. The major points for consideration are to have the vent as a unit ejected by the knock out pin 5, and also angle A cannot be less than 90°, angle D is 90°.

As those people in the molding industry well know different size vents are required depending on size of the part being molded, and in view of this Table I below lists the dimension of various vent wells.

In the Table I listed below, are typical dimensions of the vent well variations of this invention, and wherein the vent well is a right triangle in elevation with angle B-60°, and angle H-30°. This Table amounts to a ready reference for the vent system and serves as a guide for constructing vent wells of various sizes. This invention is not to be limited to these dimensions.

TABLE I

| "J" | "L" | "E" | "F" |
| --- | --- | --- | --- |
| 0.254 | 0.526 | 0.394 | 0.356 |
| 0.356 | 0.762 | 0.571 | 0.457 |
| 0.483 | 1.05 | 0.791 | 0.585 |
| 0.610 | 1.35 | 1.01 | 0.710 |
| 0.736 | 1.64 | 1.25 | 0.839 |
| 0.864 | 1.94 | 1.45 | 0.965 |
| 0.991 | 2.23 | 1.67 | 1.09 |

(All of above dimensions are c.m.)

See FIG. 4 for location of dimensions J, L, E and F. It is to be pointed out that the drawings comprising the various FIGS. 1, 2, 3 and 4 depict the vent system on a horizontal plane which in general would be for transfer molding of thermoset molding compounds, however the vent system can be vertical when the dies are mounted vertically and the die kiss area is also vertical, as in injection molding of thermoset molding compound.

From the above then the vent system can be in any plane where a vent would be required.

To more clearly describe the vent system of this invention, it is suggested that vent 6 be not over 1.27 cm in length and in thickness of 0.0051 cm to 0.0063 cm. Vent 4 to be about 2.38 mm in length, and a vent thickness at 17 of 0.0051 cm±0.00127 cm, and having a 4° taper as above described. Vent system width can vary from 0.32 cm to 0.64 cm or more, which is a function of size, or rate of fill of die, and to be determined by trial evaluation, so that vent well 3 is filled on each molding cycle.

Having described my invention, I claim:

1. Apparatus for venting of die in molding of thermoset molding compounds, said apparatus comprising a die vent system consisting of vent path extending to vent well and vent opening from said vent well to atmosphere, and said vent well is connected to a molding die by means of said vent path having a taper of 4° tapering outwardly from said die to said vent well exhausting into said vent opening to the atmosphere whereby molding compound fills said die vent system.

2. Venting of die in molding of thermoset plastic molding compounds of claim 1, wherein die vent system consisting of said vent path having a taper of 4° tapering outwardly from said die, and said vent well is a right triangle having angles of 30°, 60° and 90° with the hypotenuse parallel to said vent path and said vent well connected to said vent opening exhausting to atmosphere and whereby molding compound fills said die vent system.

3. Die venting apparatus in molding of theremoset plastic compounds wherein the improvement comprises a die vent system consisting of a die vent well to vent opening to atmosphere and wherein said die vent is tapered outwardly at 4°, and said vent well is a right triangle having angles of 30°, 60°, 90° with the hypotenuse parallel to said vent path and said vent well connected to said vent opening exhausting to atmosphere, and whereby molding compound fills said die vent system.

* * * * *